(12) United States Patent
Gershfeld (10) Patent No.: US 8,681,273 B1
(45) Date of Patent: Mar. 25, 2014

(54) SELF CONFIGURING DISTRIBUTION AMPLIFIER FOR DIGITAL VIDEO SIGNALS

(76) Inventor: Jack Gershfeld, Fullerton, CA (US)

(*) Notice: Subject to any disclaimer, the term of this patent is extended or adjusted under 35 U.S.C. 154(b) by 15 days.

(21) Appl. No.: 13/607,918

(22) Filed: Sep. 10, 2012

(51) Int. Cl.
*H04N 5/14* (2006.01)
(52) U.S. Cl.
USPC .......................................... 348/571; 348/705
(58) Field of Classification Search
USPC .......................................................... 348/571
See application file for complete search history.

(56) References Cited

U.S. PATENT DOCUMENTS

| | | | | |
|---|---|---|---|---|
| 6,900,848 B2* | 5/2005 | Sendelweck et al. | ......... | 348/607 |
| 7,671,602 B1* | 3/2010 | Hronik | ........... | 324/531 |
| 2011/0016249 A1* | 1/2011 | Nakabo et al. | ............... | 710/303 |

* cited by examiner

*Primary Examiner* — Jefferey Harold
*Assistant Examiner* — Justin Sanders
(74) *Attorney, Agent, or Firm* — Vladi Khiterer (57) ABSTRACT

A self configuring distribution amplifier for digital video signals comprises a number of signal processing circuits disposed on a bus along a signal propagation direction. Each signal processing circuit has an input and an output, as well as an input detection circuit controlling three different switches. The positions of the switches determines whether a signal from a particular input is present on a particular output and on the bus. This allows the self configuring distribution amplifier to distribute digital video signals from a number of inputs to a number of outputs in desired combinations.

1 Claim, 7 Drawing Sheets

SELF CONFIGURING DISTRIBUTION AMPLIFIER FOR DIGITAL VIDEO SIGNALS

FIELD OF THE INVENTION

The present invention relates to a self configuring distribution amplifier for digital video signals, and more specifically, a distribution amplifier capable of distributing digital video signals from a number of inputs to a number of outputs, in desired combinations.

BACKGROUND OF THE INVENTION

A distribution amplifier for digital video signals receives a digital video signal on its sole input and sends the same digital video signal to multiple outputs. On the other hand, a matrix switcher for digital video signals has multiple inputs and multiple outputs, and is capable of distributing different digital video signals from multiple inputs to multiple outputs in desired combinations. A matrix switcher thus has an advantage over a distribution amplifier in that it has the flexibility of receiving different digital video signals on multiple inputs and sending different digital video signals to the desired outputs in desired combinations.

However, matrix switchers for digital video signals are more complex and expensive devices than distribution amplifiers. It is therefore desirable to have a self configuring digital video distribution amplifier capable of distributing digital video signals from a number of inputs to a number of outputs in desired combinations without the expense and complexity of a matrix switcher.

SUMMARY OF THE INVENTION

The self configuring distribution amplifier for digital video signals according to this invention satisfies this need. It comprises a number of signal processing circuits disposed on a bus along a signal propagation direction. Each signal processing circuit has an input and an output, as well as an input detection circuit controlling three different switches. Depending on whether or not a digital video signal is present on the input, the three switches are placed in a particular configuration.

If a digital video signal is present on any particular input, the three switches are configured in such a way that the digital video signal present on the input will be also present on the output and on the bus after the signal processing circuit in the signal propagation direction. Any signal present on the bus before the signal processing circuit in the signal propagation direction will be disconnected from the bus. If a digital video signal is not present on any particular input, the three switches are configured in such a way that any signal present on the bus before the signal processing circuit in the signal propagation direction will be present on the output and on the bus in the signal propagation direction.

The positions of the switches determines whether a signal from a particular input is present on a particular output and on the bus. This allows the self configuring distribution amplifier to distribute digital video signals from a number of inputs to a number of outputs in desired combinations.

DETAILED DESCRIPTION

This invention will be better understood with reference to the drawing FIGS. 1 through 7. The same numerals refer to the same elements on all drawing figures.

Figure 1:
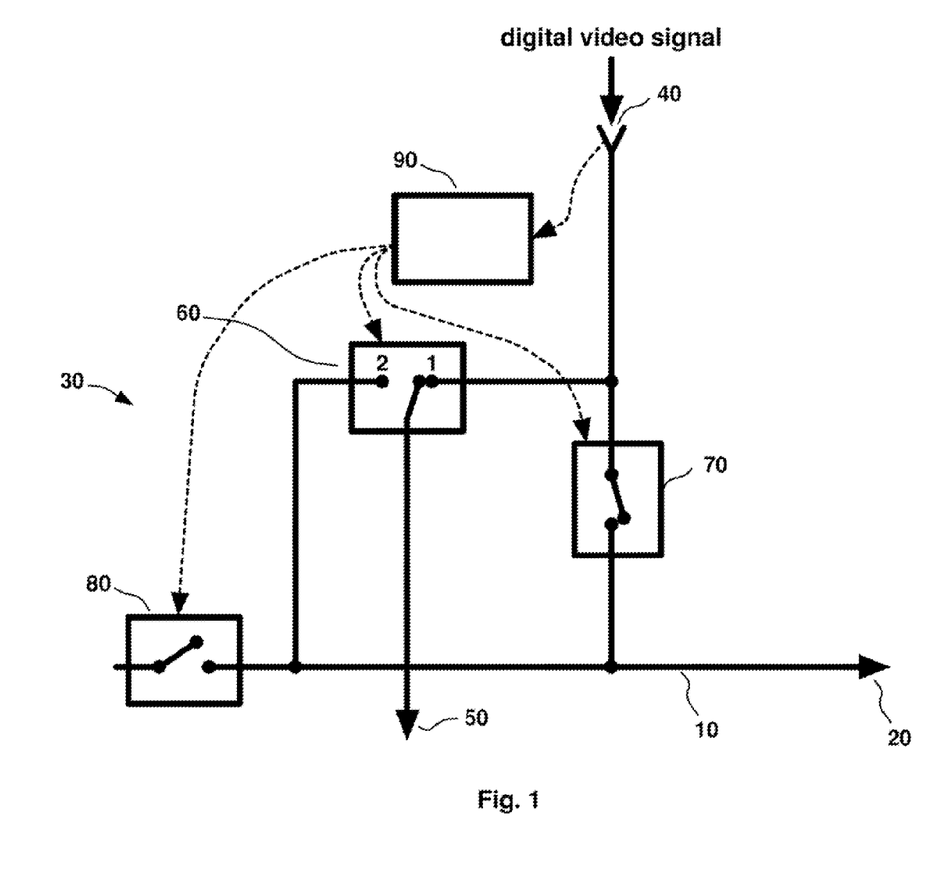
FIG. 1 shows a schematic of a signal processing circuit with a digital video signal present on the input.
Figure 2:
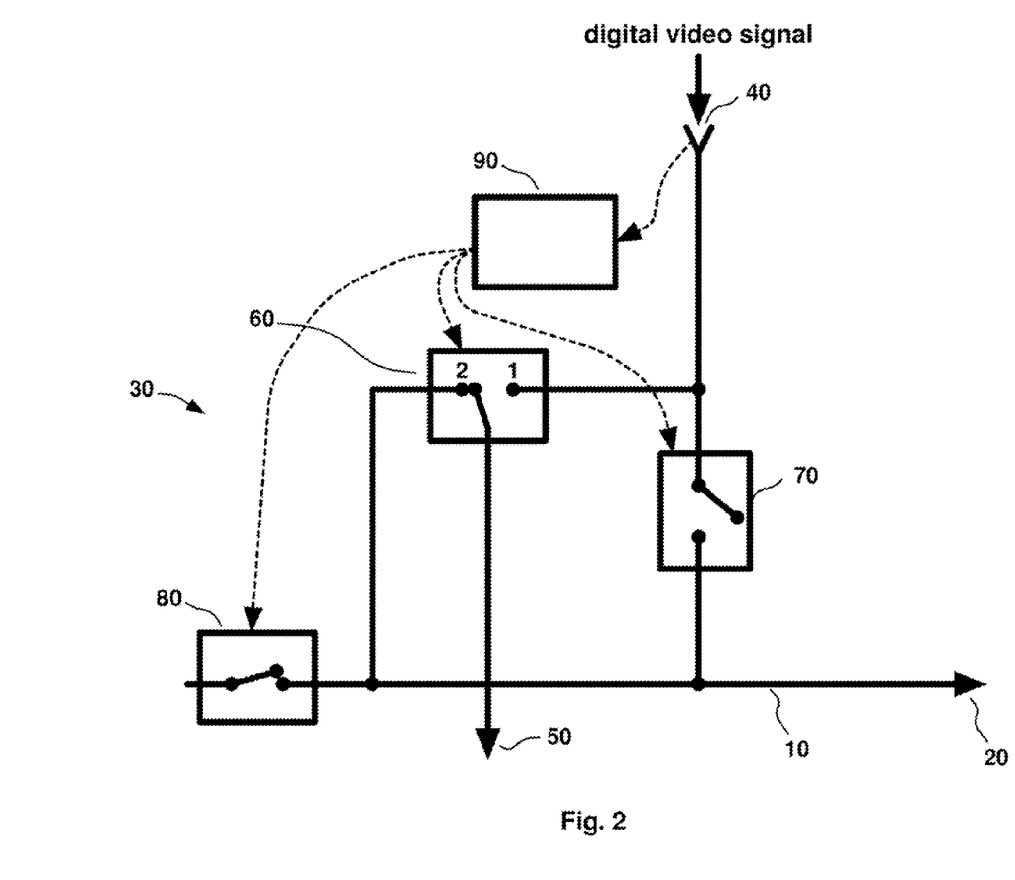
FIG. 2 shows a schematic of a signal processing circuit with a digital video signal not present on the input.

Viewing, simultaneously, FIG. 1 and FIG. 2, numeral 10 indicates a bus. Bus 10 comprises a signal propagation direction indicated by numeral 20. In the FIGS. 1 and 2, signal propagation direction 20 is shown by an arrow pointing to the right side of the figures.

Numeral 30 indicates a signal processing circuit. A plurality of signal processing circuits 30 is disposed along signal propagation direction 20. Each signal processing circuit 30 comprises an input indicated by numeral 40, an output indicated by numeral 50, a first switch indicated by numeral 60, a second switch indicated by numeral 70, and a bus switch indicated by numeral 80.

First switch 60 has a first position indicated by numeral 1 and a second position indicated by numeral 2. The first position places input 40 in electrical communication with output 50. Second position places output 50 in electrical communication with bus 10.

Second switch 70 has an on position and an off position. The on position places input 40 in electrical communication with bus 10. The off position places input 40 out of electrical communication with bus 10.

Bus switch 80 is connected serially with bus 10 and has an engaged position and a disengaged position. The engaged position establishes bus 10 connection and the disengaged position breaks bus 10 connection.

Numeral 90 indicates an input detection circuit. Input detection circuit 90 controls first switch 60, second switch 70 and bus switch 80.

Viewing now FIG. 1, a digital video signal is shown to be present at input 40. Input detection circuit 90 detects said digital video signal and causes first switch 60 to be placed in the first position. Input detection circuit 90 causes second switch 70 to be placed in the on position. Input detection circuit 90 causes bus switch 80 to be placed in the disengaged position.

This causes the digital video signal present on input 40 to be present on output 50 and on bus 10 after signal processing circuit 30 in signal propagation direction 20 (i.e., to the right of signal processing circuit 30 in FIG. 1). This also causes any signal present on bus 10 before signal processing circuit 30 in signal propagation direction 20 (i.e., to the left of signal processing circuit 30 in FIG. 1) to be disconnected from bus 10.

Viewing now FIG. 2, a digital video signal is shown not to be present at input 40. Input detection circuit 90 detects the absence of the digital video signal and causes first switch 60 to be placed in the second position. Input detection circuit 90 causes second switch 70 to be placed in the off position. Input detection circuit 90 causes bus switch 80 to be placed in the engaged position.

This causes any signal present on bus 10 before signal processing circuit 30 in signal propagation direction 20 to be present on output 50 and on bus 10 after signal processing circuit 30 in signal propagation direction 20.

Figure 3:
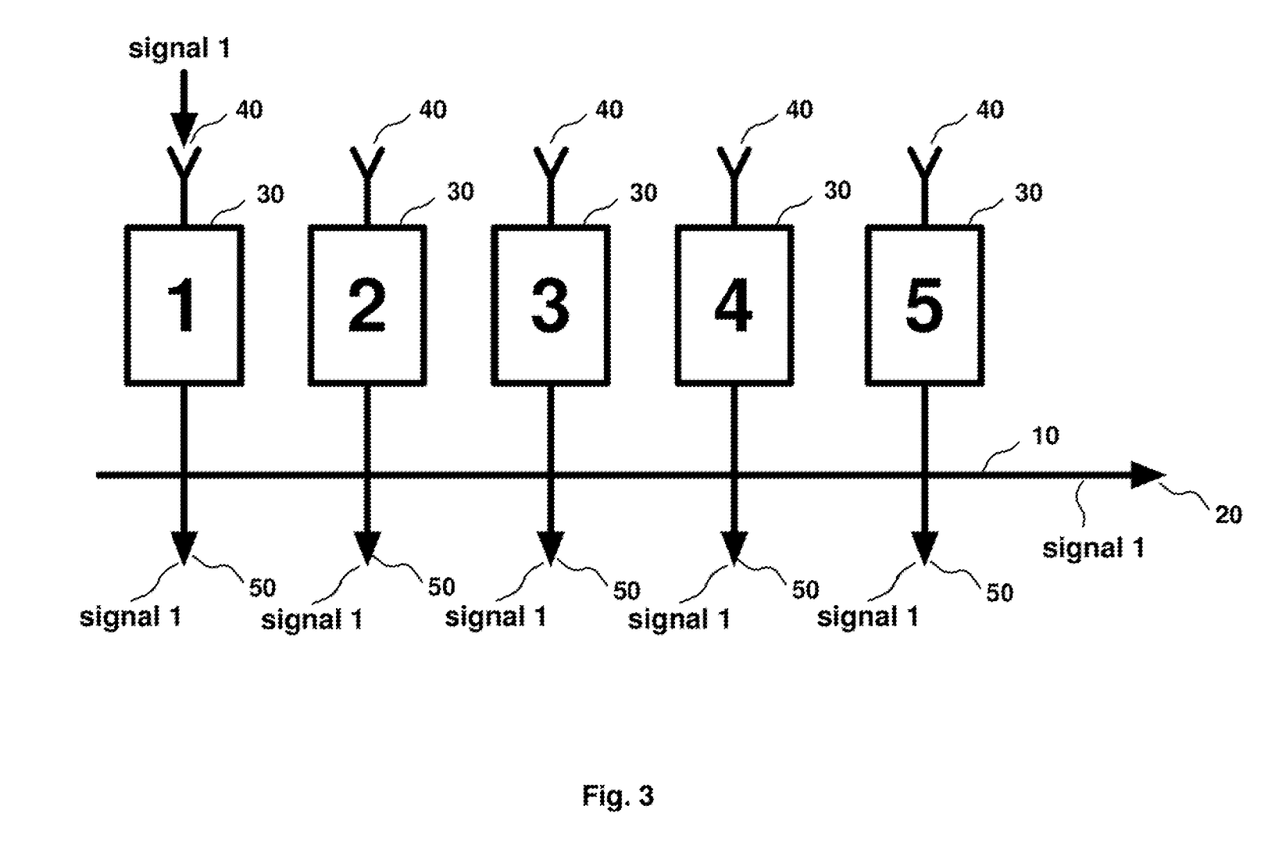
FIG. 3 through FIG. 7 show signal distribution diagrams with different combinations of digital video signals present on various inputs.

Viewing now FIG. 3, a total of five signal processing circuits 30, numbered 1 through 5, are disposed along signal propagation direction 20. A digital video signal is shown to be present at input 40 of signal processing circuit 30 numbered 1.

This digital video signal is indicated by "signal 1". No digital video signal is shown to be present at inputs 40 of signal processing circuits 30 numbered 2 through 5. Accordingly, signal 1 is present on output 50 of signal processing circuit 30 numbered 1. Signal 1 is also present on bus 10 and, therefore, on outputs 50 of signal processing circuits 30 numbered 2 through 5 (i.e. the signal processing circuits 30 after signal processing circuits 30 numbered 1 in signal propagation direction 20, or to the right of it).

The configuration shown in FIG. 3 can be used, for example, in a courtroom during a jury trial. Signal 1 can be an exhibit show during trial. Output 50 of signal processing circuits 30 numbered 1 can be connected to a monitor for the judge. Output 50 of signal processing circuits 30 numbered 2 can be connected to a monitor for the plaintiff's counsel. Output 50 of signal processing circuits 30 numbered 3 can be connected to a monitor for the defendant's counsel. Output 50 of signal processing circuits 30 numbered 4 can be connected to a monitor for the witness. Output 50 of signal processing circuits 30 numbered 5 can be connected to a monitor for the jury. All these monitors will be showing the same exhibit, namely, signal 1.

Figure 4:
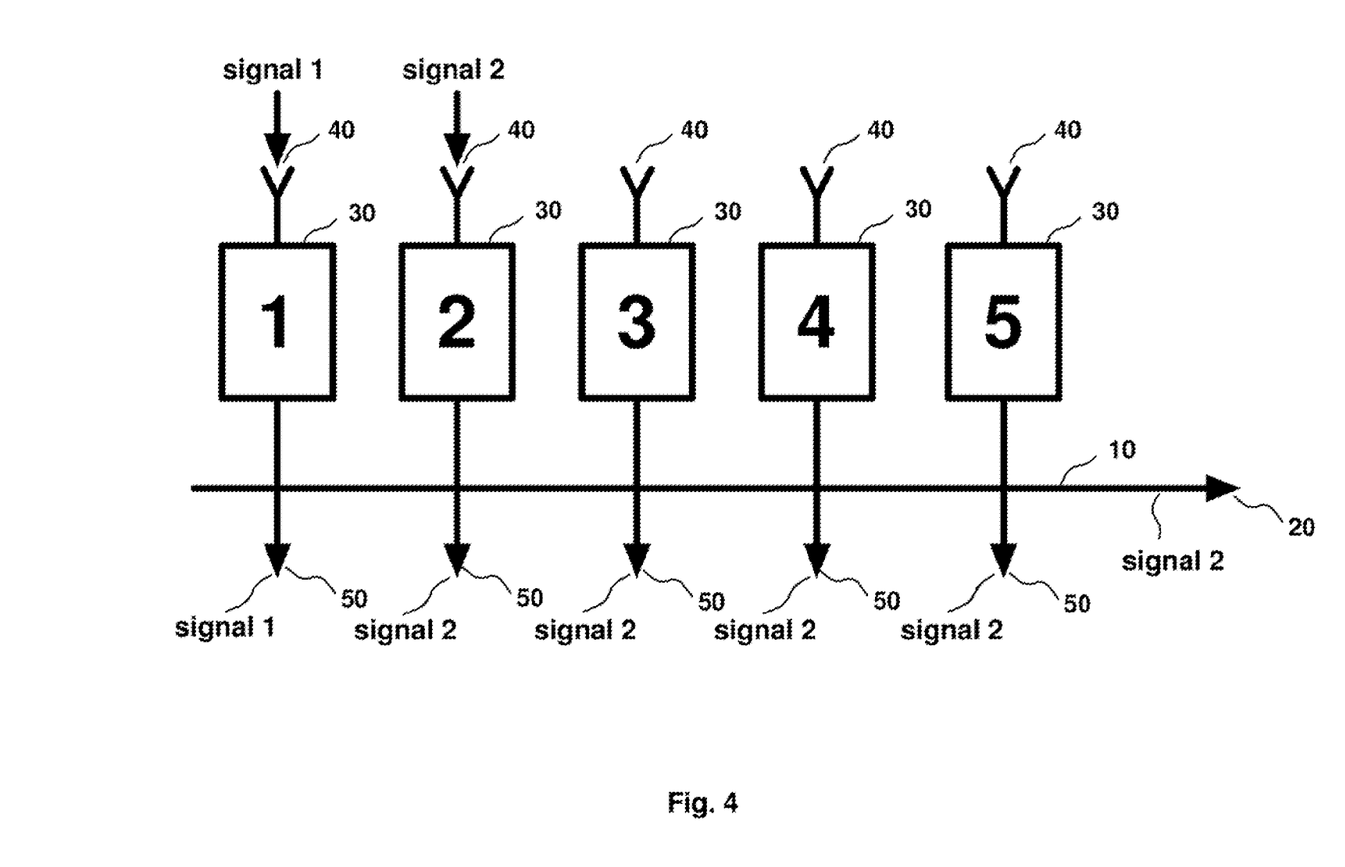

Viewing now FIG. 4, a digital video signal is shown to be present at input 40 of signal processing circuit 30 numbered 1. This digital video signal is indicated by "signal 1". A digital video signal is also shown to be present at input 40 of signal processing circuit 30 numbered 2. This digital video signal is indicated by "signal 2". No digital video signal is shown to be present at inputs 40 of signal processing circuits 30 numbered 3 through 5.

Accordingly, signal 1 is present on output 50 of signal processing circuit 30 numbered 1. Signal 2 is present on output 50 of signal processing circuit 30 numbered 2 and on bus 10 and, therefore, on outputs 50 of signal processing circuits 30 numbered 3 through 5 (i.e. the signal processing circuits 30 after signal processing circuits 30 numbered 2 in signal propagation direction 20). However, because of the presence of signal 2 on input 40 of signal processing circuits 30 numbered 2, signal 1 is disconnected from bus 10 and is not present on bus 10 and, therefore, on outputs 50 of signal processing circuits 30 numbered 3 through 5.

Figure 5:
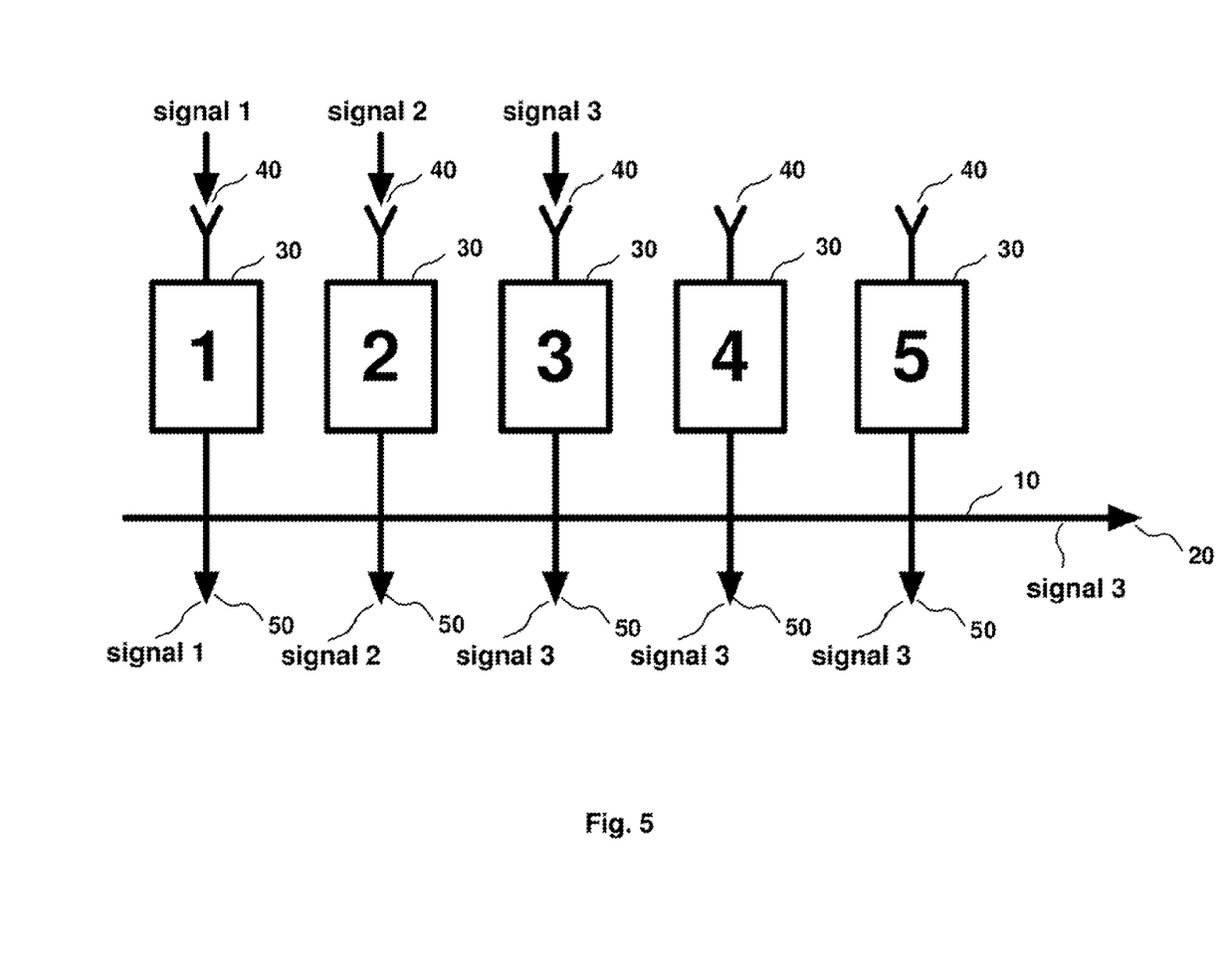

Viewing now FIG. 5, a digital video signal is shown to be present at input 40 of signal processing circuit 30 numbered 1. This digital video signal is indicated by "signal 1". A digital video signal is also shown to be present at input 40 of signal processing circuit 30 numbered 2. This digital video signal is indicated by "signal 2". A digital video signal is also shown to be present at input 40 of signal processing circuit 30 numbered 3. This digital video signal is indicated by "signal 3". No digital video signal is shown to be present at inputs 40 of signal processing circuits 30 numbered 4 and 5.

Accordingly, signal 1 is present on output 50 of signal processing circuit 30 numbered 1. Signal 2 is present on output 50 of signal processing circuit 30 numbered 2. Signal 3 is present on output 50 of signal processing circuit 30 numbered 3 and on bus 10 and, therefore, on outputs 50 of signal processing circuits 30 numbered 4 and 5 (i.e. the signal processing circuits 30 after signal processing circuits 30 numbered 3 in signal propagation direction 20). However, because of the presence of signal 3 on input 40 of signal processing circuits 30 numbered 3, both signal 1 and signal 2 are disconnected from bus 10 and are not present on bus 10 and, therefore, on outputs 50 of signal processing circuits 30 numbered 4 and 5. Similarly, because of the presence of signal 2 on input 40 of signal processing circuits 30 numbered 2, signal 1 is disconnected from bus 10 and is not present on output 50 of signal processing circuits 30 numbered 2.

Figure 6:
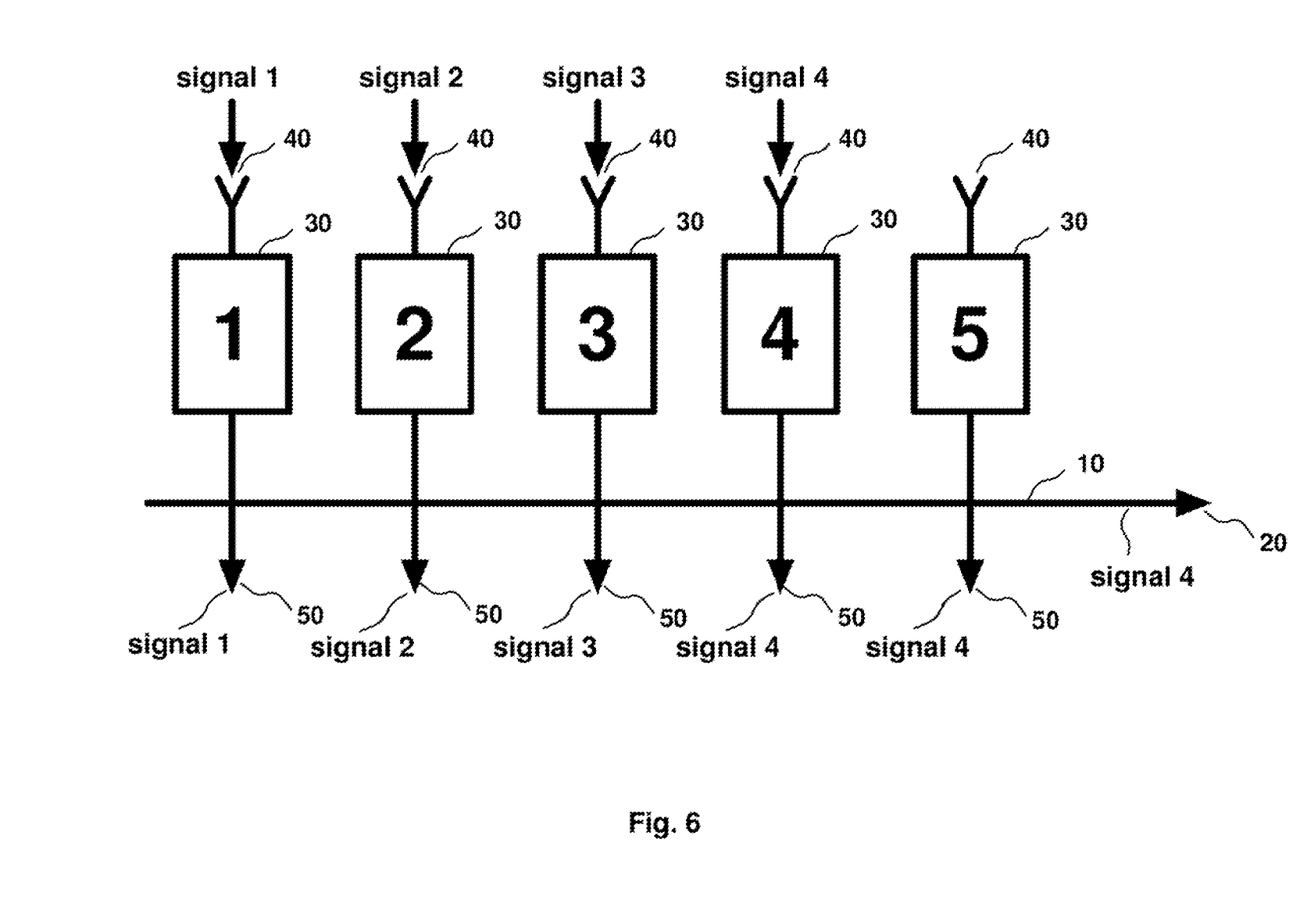

Viewing now FIG. 6, a digital video signal is shown to be present at input 40 of signal processing circuit 30 numbered 1. This digital video signal is indicated by "signal 1". A digital video signal is also shown to be present at input 40 of signal processing circuit 30 numbered 2. This digital video signal is indicated by "signal 2". A digital video signal is also shown to be present at input 40 of signal processing circuit 30 numbered 3. This digital video signal is indicated by "signal 3". A digital video signal is also shown to be present at input 40 of signal processing circuit 30 numbered 4. This digital video signal is indicated by "signal 4". No digital video signal is shown to be present at input 40 of signal processing circuits 30 numbered 5.

Accordingly, signal 1 is present on output 50 of signal processing circuit 30 numbered 1. Signal 2 is present on output 50 of signal processing circuit 30 numbered 2. Signal 3 is present on output 50 of signal processing circuit 30 numbered 3. Signal 4 is present on output 50 of signal processing circuit 30 numbered 4 and on bus 10 and, therefore, on output 50 of signal processing circuit 30 numbered 5. However, signal 1, signal 2 and signal 3 are disconnected from bus 10 and are not present on bus 10 and, therefore, on outputs 50 of signal processing circuits 30 numbered 4 and 5.

Figure 7:
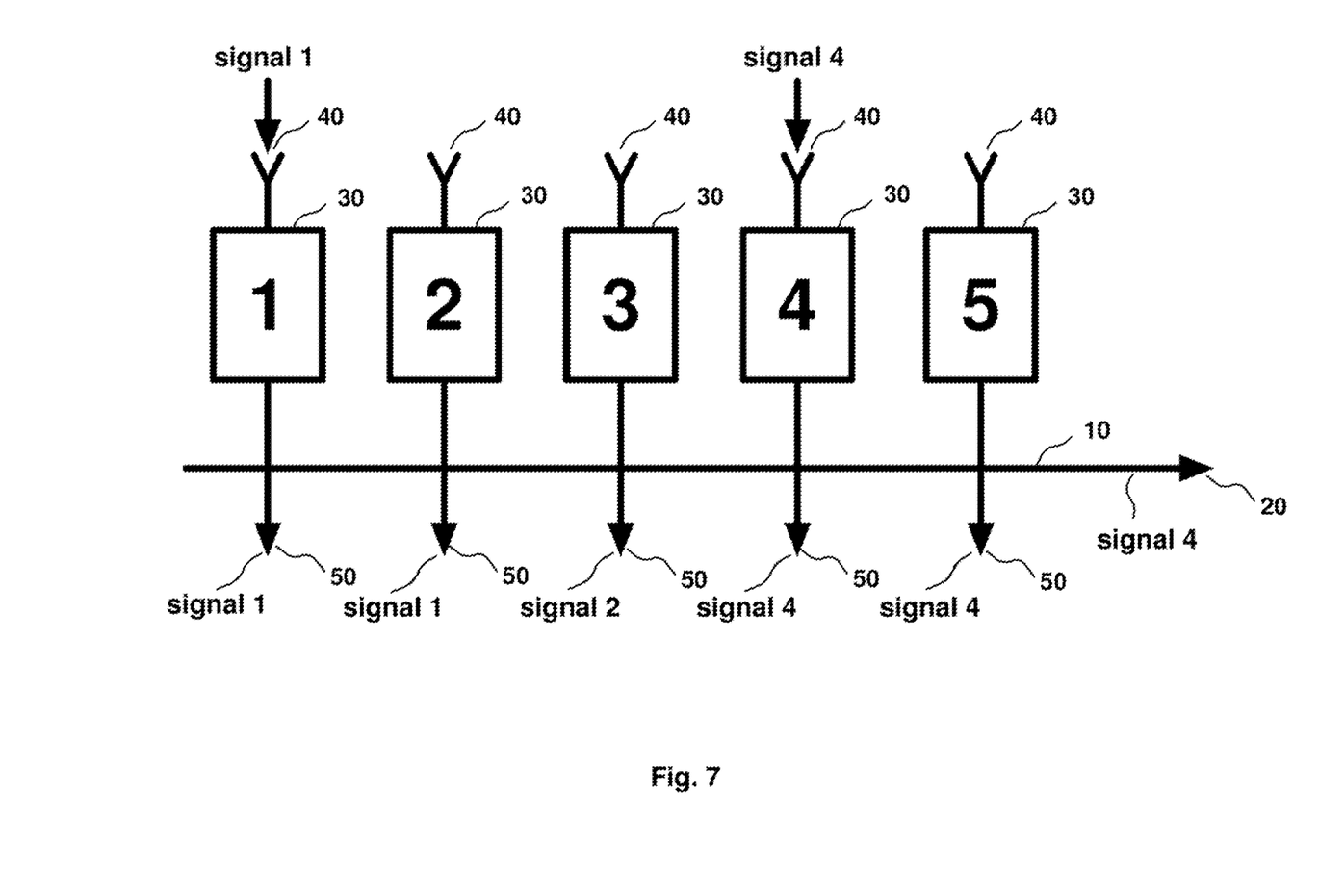

Viewing now FIG. 7, a digital video signal is shown to be present at input 40 of signal processing circuit 30 numbered 1. This digital video signal is indicated by "signal 1". A digital video signal is also shown to be present at input 40 of signal processing circuit 30 numbered 4. This digital video signal is indicated by "signal 4". No digital video signal is shown to be present at input 40 of signal processing circuits 30 numbered 2, 3 and 5.

Accordingly, signal 1 is present on outputs 50 of signal processing circuits 30 numbered 1, 2 and 3. Signal 4 is present on outputs 50 of signal processing circuits 30 numbered 4 and 5 and on bus 10 after signal processing circuit 30 numbered 5 in signal propagation direction 20.

The configuration shown in FIG. 7 can be used, for example, in a retail store. Signal 1 can be an advertisement for the first product and signal 4 can be an advertisement for the second product. Outputs 50 of signal processing circuits 30 numbered 1, 2 and 3 can be connected to monitors showing the advertisement for the first product. Outputs 50 of signal processing circuits 30 numbered 4 and 5 can be connected to monitors showing the advertisement for the second product.

As is shown in reference to FIG. 3 through 7, the self configuring distribution amplifier according to this invention allows to distribute digital video signals from a number of inputs to a number of outputs in desired combinations. As should be clear, even though only five signal processing circuits 30 are shown in FIG. 3 through 7, the number of signal processing circuits 30 that can be disposed along signal propagation direction 20 is not limited. Further, signal propagation direction 20 is shown in FIG. 1 through FIG. 7 to be to the right of the figures. Signal propagation direction 20 can be to the left as well.

While the present invention has been described and defined by reference to the preferred embodiment of the invention, such reference does not imply a limitation on the invention, and no such limitation is to be inferred. The invention is capable of considerable modification, alteration, and equivalents in form and function, as will occur to those ordinarily skilled and knowledgeable in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

I claim:

1. A self configuring distribution amplifier for digital video signals comprising:
- a bus comprising a signal propagation direction;
- a plurality of signal processing circuits disposed along the signal propagation direction, each comprising:
  - an input;
  - an output;
  - a first switch having a first position and a second position, wherein the first position places the input in electrical communication with the output and the second position places the output in electrical communication with the bus;
  - a second switch having an on position and an off position, wherein the on position places the input in electrical communication with the bus and the off position places the input out of electrical communication with the bus;
  - a bus switch connected serially with the bus and having an engaged position and a disengaged position, wherein the engaged position establishes the bus connection and the disengaged position breaks the bus connection;
  - an input detection circuit controlling the first, second and bus switches such that when a digital video signal is present on the input, the first switch is placed in the first position; the second switch is placed in the on position; the bus switch is placed in the disengaged position, thereby causing the digital video signal present on the input to be present on the output and on the bus after the signal processing circuit in the signal propagation direction, and causing any signal present on the bus before the signal processing circuit in the signal propagation direction to be disconnected from the bus;

whereby when the digital video signal is not present on the input, the first switch is placed in the second position; the second switch is placed in the off position; the bus switch is placed in the engaged position, thereby causing any signal present on the bus before the signal processing circuit in the signal propagation direction to be present on the output and on the bus after the signal processing circuit in the signal propagation direction.

* * * * *